(12) United States Patent
Reinhardt et al.

(10) Patent No.: US 8,986,419 B2
(45) Date of Patent: Mar. 24, 2015

(54) MIXTURE FOR TREATING FERTILIZERS

(75) Inventors: Petra Reinhardt, Dessau (DE); Ute Radics, Kemberg (DE); Hans-Joachim Niclas, Berlin (DE)

(73) Assignee: SKW Stickstoffwerke Piesteritz GmbH, Lutherstadt Wittenberg (DE)

( * ) Notice: Subject to any disclaimer, the term of this patent is extended or adjusted under 35 U.S.C. 154(b) by 151 days.

(21) Appl. No.: 13/702,725

(22) PCT Filed: May 27, 2011

(86) PCT No.: PCT/EP2011/002636
§ 371 (c)(1),
(2), (4) Date: Mar. 7, 2013

(87) PCT Pub. No.: WO2011/154100
PCT Pub. Date: Dec. 15, 2011

(65) Prior Publication Data
US 2013/0160507 A1    Jun. 27, 2013

(30) Foreign Application Priority Data
Jun. 8, 2010 (DE) .......................... 10 2010 022 943

(51) Int. Cl.
*C05C 9/00* (2006.01)
*C01C 1/18* (2006.01)
*A01N 25/00* (2006.01)
*C05G 3/08* (2006.01)

(52) U.S. Cl.
CPC ....................................... *C05G 3/08* (2013.01)
USPC ..................................... 71/30; 71/54; 71/64.1

(58) Field of Classification Search
CPC ........................................................ C05G 3/08
USPC .................................. 71/1, 11, 27–30, 31–63
See application file for complete search history.

(56) References Cited

U.S. PATENT DOCUMENTS

| | | | | |
|---|---|---|---|---|
| 5,472,476 A | * | 12/1995 | Schapira et al. | 71/64.12 |
| 6,066,190 A | * | 5/2000 | Grabarse et al. | 71/27 |
| 2013/0160507 A1 | * | 6/2013 | Reinhardt et al. | 71/30 |

\* cited by examiner

*Primary Examiner* — Jennifer A Smith
(74) *Attorney, Agent, or Firm* — Foley & Lardner LLP

(57) ABSTRACT

The invention relates to an aqueous solution of a mixture for treating urea-based fertilizers/fertilizers containing ammonium that contains 1,2,4-triazole and 3-methylpyrazole in the weight ratio 2/1 and at least one polyvinyl alcohol, polyvinylpyrrolidone and a tenside.

9 Claims, No Drawings

MIXTURE FOR TREATING FERTILIZERS

CROSS-REFERENCE TO RELATED APPLICATIONS

This application is a National Stage application of PCT/2011/002636, filed May 27, 2011, which claims priority from German patent application 10 2010 022 943.1, filed Jun. 8, 2010.

Across the world fertilisation with nitrogen is predominantly implemented with the aid of urea or also urea mixtures with other fertiliser components such as for example ammonium sulphate.

The fertilising effect of the urea on farmland is based upon the hydrolytic conversion of the urea by the urease enzyme ubiquitously present in the ground into ammonium ions and hydrogen carbonate. In the biologically active soil the ammonium ion can be oxidised very quickly to nitrate by the effect of Nitrosomas and Nitrobacter bacteria via nitrite.

By means of nitrification inhibitors the microbial conversion of ammonium nitrogen into nitrate nitrogen in the ground is inhibited over a specific period of time and in this way brings about improved utilisation of the nitrogen by the plant because the risk of nitrate displacement is clearly reduced. At the same time laughing gas emissions can be reduced by more than 50%.

On the basis of its mode of operation the use of nitrogen fertilisers combined with nitrification inhibitors makes both economically and ecologically advantageous effects possible. As a result of the inhibition of the microbial oxidation of the fertilised ammonium nitrogen to nitrate which lasts for a period of 4 to 12 weeks, the nitrogen is predominantly in the form of ammonium (available to the plants), and N losses caused by nitrate being washed out and laughing gas emissions are reduced. Combined with certain advantages of ammonium-accentuated plant nutrition, the reduction of the loss potential makes it possible to reduce the N expenditure with the yield level remaining just as high and to combine procedural steps, and this leads to economic advantages.

The use of N-stabilised fertilisers can contribute to the reduction of the excess nitrogen in agriculture. This is an eco-political requirement that agricultural production must increasingly fulfil.

It has been demonstrated that the use of nitrogen fertilisers provided with nitrification inhibitors has a particularly advantageous effect in water protection zones because the entry of this form of nitrogen into bodies of water can be considerably reduced by the delayed formation of nitrate.

A large number of different substances and substance mixtures have been proposed as effective nitrification inhibitors (see e.g. M. E. TRENKEL, Improving Fertilizer Use Efficiency—Controlled-Release and Stabilized Fertilizers in Agriculture; International Fertilizer Industry Association (ifa), Paris December 1997).

On the basis of their chemical and physical properties only a few of the proposed substances are, however, suitable for practical use as nitrification inhibitors.

Dicyandiamide (DCD) is therefore one of the rare active substances which can be introduced into a urea molten mass without decomposing (see e.g. EP 0 908 430 B1). In order to guarantee a reliable nitrification-inhibiting effect however, 3 to 10% by weight dicyandiamide must be incorporated into the urea, and this means a comparably high proportion of active substance.

DE 44 05 392 C1 describes active substance combinations for inhibiting or controlling nitrification with which one can successfully reduce the active substance content required with dicyandiamide as the only substance by up to 80%. One example successfully implemented in the industry is the synergistically active combination of dicyandiamide with 1H-1,2,4-triazole.

The production disclosed in DE 103 42 551 of a solid fertiliser comprising urea or urea/ammonium sulphate with a nitrification inhibitor mixture of dicyandiamide and 1,2,4,-triazole in a weight ratio of 10:1 is a technologically demanding process and requires both the presence of the required facilities and the corresponding know-how. The dicyandiamide is granulated here in the molten mass with the urea and the 1,2,4-triazole is finally applied to the surface of the granules as a concentrated aqueous solution.

Correspondingly produced so-called "stabilised solid fertilisers" are widely accepted in agricultural practice, and so there is a requirement across the world.

This requirement can not currently be met because on the one hand transportation of these fertilisers over a large distance is not economically feasible, and on the other hand special facilities are required for on-site production due to the aforementioned pre-requisites.

For this reason it was the object to develop a nitrification-inhibiting mixture which can be used for the simple treatment of fertilisers containing ammonium which are available on-site regionally and which enables production of a nitrogen-stabilised fertiliser without any special technical requirements. Here the most highly effective possible nitrification inhibitors with good environmental compatibility should be used.

The application of the nitrification inhibitor mixture of dicyandiamide and 1,2,4-triazole 10:1 as a powder to the surface of urea granules has the shortcoming already known from DCD solo application. Thus, the solids do not adhere securely to the surface, and when handling the fertiliser this leads to troublesome abrasion and dust. The methods described in DE-OS 36 01 805 and DE-OS 25 31 962 for DCD using additional adhesive agents would make use of the active substance mixture complicated and expensive. For the application as an aqueous formulation the solubility of dicyandiamide with 32 g/l is far too low.

The inhibitor combination of 1,2,4-triazole (TZ) and 3-methylpyrazole (3-MP) is characterised by more beneficial physicochemical properties and by increased effectiveness, and so it would be advantageous to use 3-methylpyrazole instead of dicyandiamide. However, liquid 3-methylpyrazole is so volatile that when applied even at a low temperature and also when fertiliser coated with the latter is stored, distinct proportions of the 3-methylpyrazole volatilise, and this results in active substance losses, but also has a negative impact upon the environment. For this reason until now this combination has only been used on a large scale in liquid fertilising systems.

In DE 41 28 828 the application of a salt comprising 3-methylpyrazole and an acid in order to produce solid fertilisers containing urea is described. The formation of salt should fix the active substance on the urea. Under the influence of atmospheric moisture, in particular when combined with urea however, the volatile pyrazole is released again, and so a layer of wax also has to be applied as additional protection against the volatility of the nitrification inhibitor. EP 1 340 738 and EP 1 323 695 also disclose the production of solid fertilisers containing urea with nitrification inhibitors by applying pyrazoles as salt solutions or salt suspensions. For this purpose either special technical pre-requisites for the mixing (EP 1 340 738) are necessary, or temperatures of 70 to 130° C. are required. However, the latter must be ruled out for mixtures containing 3-methylpyrazole due to the volatility of 3-MP.

Patent application DE 10 2009 036229, in which an anti-caking agent containing a polyvinyl alcohol, a tenside and at least one nitrification inhibitor is disclosed, is also associated with the same shortcoming. Here too the fertiliser granules are heated to up to 50° C. after treatment with the anti-caking agent, and this would result in a high 3-MP loss.

Since the previously proposed methods for the application of nitrification inhibitors to solid fertilisers are not feasible for practical use of the triazole(TZ)/3-MP active substance mixture it was the object to develop a mixture containing TZ/MP which can be used for the simple treatment of urea-based fertilisers or those containing ammonium which are available on-site regionally and enables production of a nitrogen-stabilised fertiliser without any special technical requirements.

The object is achieved according to the invention by an aqueous solution, as defined in claim 1, that contains at least one polyvinyl alcohol and polyvinylpyrrolidone, 1,2,4-triazole, 3-methylpyrazole (3-MP) and a tenside, being used.

It has in fact been shown that the highly effective nitrification inhibitor mixture containing 1,2,4-triazole, 3-methylpyrazole (3-MP) in the weight ratio 2/1 and prepared with polyvinyl alcohol and polyvinylpyrrolidone can be applied as an aqueous concentrate to urea-based fertilisers and those containing ammonium using simple means.

Surprisingly the 3-methylpyrazole, which is known to be volatile, is fixed to the granules for a number of weeks, as demonstrated in corresponding storage tests.

The combination of polyvinyl alcohol (PVA) with the formulation additive polyvinylpyrrolidone (PVP) brings about fixing of the volatile 3-methylpyrazole to the fertiliser.

The invention relates furthermore to the method defined in claim 9 for producing the mixture according to the invention.

Further preferred and/or advantageous embodiments are the subject matter of the subclaims.

Without wishing to commit to a theory, it is assumed that adhesion to the polar fertiliser granules is achieved by the interaction of the OH groups of the polyvinyl alcohol, whereas due to the very polar structure of the pyrrolidone units PVP is capable of forming strong hydrogen bridges and in this way can bind the azoles by means of their NH group.

The addition of a surface-active substance (tenside) improves the anti-caking effect and moreover the distribution of the viscous liquid over the fertiliser.

The highly concentrated nitrification inhibitor preparation is applied by spraying the fertiliser rotating in a mixer at ambient temperature. Neither pre-heating of the granules nor final drying are required.

The fertiliser provided with nitrification inhibitor can be applied immediately. If so required however, it can also be stored for a few weeks as loose bulk in a storage building.

The mixture for treating fertilisers containing 1,2,4-triazole/3-methylpyrazole, polyvinyl alcohol, polyvinylpyrrolidone and tenside in water is stable over a long period of time. This also relates to temperatures up to −15° C.

In the mixture according to the invention for treating fertilisers polyvinyl alcohols with the viscosity of the 4% aqueous solution being 2 to 5 mPas and a hydrolysis level of 90 to 100% are preferably used. The fixing of the 3-methylpyrazole to the fertiliser by combining polyvinyl alcohols with polyvinylpyrrolidone increases as the hydrolysis level of the polyvinyl alcohol increases. Therefore polyvinyl alcohols with a hydrolysis level of over 95% are particularly preferred as those used according to the invention.

According to the invention polyvinylpyrrolidone is added in quantities of 0.1 to 5%. Polyvinylpyrrolidone with the customary molar masses of 2,000 to 40,000 g/mol can be used here. The choice is made depending on the properties of the polyvinyl alcohol used in such a way that the viscosity of the mixture according to the invention is set at <400 mPas (20° C.).

As tensides, the mixture according to the invention can contain cationic, anionic or non-ionic substances or a mixture of different surface-active materials. Preferably, an ester is used between a fatty acid and polyoxyethylene sorbitan, the fatty acids preferably comprising lauric, palmitic, stearic and oleic acid.

The mixture according to the invention for treating fertilisers has e.g. the following composition:
  5 to 20% polyvinyl alcohol
  0.1 to 5% polyvinylpyrrolidone
  20 to 55% 1,2,4-triazole/3-methylpyrazole in the ratio 2:1
  0.1 to 3% tenside
  25 to 65% water The aqueous solution of the mixture according to the invention for treating fertilisers containing ammonium is applied in a quantity of 0.1 to 0.9% in relation to the weight of the fertiliser.

All known fertilisers containing urea and ammonium can be used as fertilisers.

The present invention will now be described using the following examples without restriction and so only as an illustration.

EXAMPLE 1

Production of a Nitrification Inhibitor Concentrate in the Laboratory 112 g water (deionate) and 2 g of a non-ionic tenside, preferably polysorbate 80 are placed in a double jacketed agitator vessel made of glass with a paddle mixer and a reflux condenser at room temperature. 24 g polyvinyl alcohol (PVA), for example 3-85, are added to this solution while stirring. 2 g polyvinylpyrrolidone (PVP 10, CAS 9003-39-8) are then added to the mixture. 40 g 1,2,4-triazole are weighed into this mixture. The mixture is heated to approx. 45° C. while stirring and kept at 45° C. for 2 hours until it has completely dissolved. Next the solution is cooled to 25° C. to 30° C. 20 g 3-methylpyrazole are dissolved in this solution while stirring.

For practical use preparations with the highest possible proportion of active substance are generally desirable in order to keep the proportion of ineffective carrier material low for packaging and transportation. It is therefore possible, as shown by Example 2 to Example 4, to increase the 1,2,4-triazole and 3-methylpyrazole content in the preparation to e.g. 45%.

EXAMPLE 2

Production of a Nitrification Inhibitor Concentrate in the Laboratory 84 g water (deionate) and 2 g of a non-ionic tenside, preferably polysorbate 80 are weighed into a double jacketed agitator vessel made of glass with a paddle mixer and a reflux condenser at room temperature. 24 g polyvinyl alcohol (PVA), for example 4-98, are added to this solution while stirring. 60 g 1,2,4-triazole are weighed into the mixture. It is then heated to 80° C. and stirred for 2 hrs at 80° C. until it has completely dissolved. The solution is cooled to 25° C., and finally 30 g 3-methylpyrazole are added.

EXAMPLE 3

Production of a Concentrate for Agricultural Use 81 kg water (condensate) and 1.4 kg of a non-ionic tenside, e.g. polysorbate 80, are placed in a heatable agitator vessel at room temperature. 24 kg polyvinyl alcohol 3-98 and 4 kg polyvinylpyrrolidone are added while stirring. Next 60 kg 1,2,4-triazole are weighed into the mixture. The solution is heated to 75 to 80° C. and stirred for 2 hours until the solid components are completely dissolved. The solution, which is now clear, is cooled to 25 to 30° C. Finally, 30 kg 3-methylpyrazole are stirred into the solution.

EXAMPLE 4

Production of a Concentrate for Agricultural Use

In a further approach 85 kg condensate and 1.4 kg polysorbate 80 are likewise placed in an agitator vessel at room temperature. 16 kg PVA 4-98 and 8 kg PVP are added while stirring. 60 kg 1,2,4-triazole are weighed into the mixture. The mixture must be heated to 80° C. until the PVA 4-98 has completely dissolved and must be stirred at this temperature for 2 hours. After dissolving it is cooled to 30° C. 30 kg 3-methylpyrazole are finally added to the cooled solution while stirring.

EXAMPLE 5

Production of a Nitrification Inhibitor Mixture with 3-Methylpyrazole Salts In Situ The 3-methylpyrazole forms salts with mineral and organic acids. In the example the conversion either with a mineral or with an organic acid is specified. The 3-methylpyrazole salts are not isolated, but in practice the complete mixture is prepared after the formation of the salt according to the following instructions:

100 g water (deionate) are placed in a commercially available triple-necked glass flask at room temperature. 14.6 g acetic acid (99% glacial acetic acid) are dissolved in the water while stirring. 20 g 3-methylpyrazole are added using a dropping funnel for neutralisation. Next 16 g PVA 4-98 and 8.8 g PVP are stirred into the aqueous solution and heated to 80° C. in order to dissolve the PVA. 40 g 1,2,4-triazole are then added to the mixture and stirred for approx. 2 hours at 80° C. until completely dissolved. Finally, 1.4 g polysorbate 80 are added to the solution.

In the same way, 82 g water (deionate) are presented at room temperature and 32.8 g hydroxysuccinic acid (malic acid) are dissolved. The dissolving process takes place endothermically, and the temperature falls from 20° C. to 11° C. 20 g 3-methylpyrazole are added drop by drop at room temperature. Next PVA 4-98 and PVP are stirred in at room temperature and heated to 80° C. 40 g 1,2,4-triazole are added to the mixture and stirred for approx. 2 hours at 80° C. until completely dissolved. Finally, 1.4 g polysorbate 80 are added to the solution.

The nitrification inhibitor concentrates produced according to Examples 1 to 5 are storage-stable solutions. They can be transported to any location for use without any problem. They can easily be used for all urea- and/or ammonium-based solid fertilisers, as the following examples show.

EXAMPLE 6

Application of Nitrification Inhibitor Mixture to Urea Granules in the Laboratory 500 g granulated urea (average granule diameter approx. 3.3 mm) are weighed into a 1000 ml screw vessel. 2.3 g of the mixture (Example 1) are weighed into this urea that is at approx. 22° C. at room temperature and is distributed well, or the mixture is sprayed on. The sealed vessel is then agitated in a shaker for 10 minutes in order to achieve optimal distribution. Next the stabilised granules can be tested in the hothouse for their biological effect. Corresponding open storage can also be started.

EXAMPLE 7

Treatment of Urea/Ammonium Sulphate Granules with Nitrification Inhibitor Mixture in the Laboratory As explained in Example 6, 500 g granules comprising urea/ammonium sulphate in the ratio 50% by weight/50% by weight are likewise sprayed at room temperature with 1.1 g of a mixture according to Example 3. The sealed vessel is then agitated for 10 minutes in the shaker. The urea/ammonium sulphate granules stabilised with nitrification inhibitor TZ/MP 2/1 can be used immediately for fertilisation, but storage is also possible.

Application of Nitrification Inhibitor Mixture onto Urea Granules

EXAMPLE 8

10 kg granulated urea are sprayed with 37 g of the nitrification inhibitor mixture (Example 4) in a commercially available cement mixer at ambient temperature (18° C.). Next the mixture is agitated for a further 30 minutes in the mixer. The stabilised urea fertiliser can be applied immediately without any further drying or other treatment.

EXAMPLE 9

1e;.5q15 kg commercially available granulated urea are agitated in a cement mixer at ambient temperature (22° C.). 56 g nitrification inhibitor mixture (Example 3) are sprayed onto the agitated granules and the mixture is agitated for a further 30 minutes in the mixer. The stabilised urea fertiliser can be applied without any further drying or also stored for a short period of time in a storage building.

Model Investigations to Demonstrate the Reduction of the Volatility of 3-Methylpyrazole by Embedding into a Polyvinyl Alcohol/Polyvinylpyrrolidone Matrix

TABLE 1

Laboratory test on the volatility of 3-methylpyrazole Storage in crystallising dishes (diameter 5 cm when open) at room temperature

| Storage time in days | 0.25 g 3-MP | 0.25 g 3-MP + 0.50 g TZ [1] loss in % | 0.50 g TZ |
|---|---|---|---|
| 1 | 12 | 5 | 0 |
| 2 | 26 | 12 | 0 |
| 3 | 40 | 19 | 1 |
| 6 | 87 | 28 | 2 |
| 12 | 100 | 34 | 2 |

[1] Mixture contains 33% 3-MP

The thermal characteristics of materials and material mixtures can be investigated very accurately with the aid of thermogravimetric analyses. In addition to degradative reactions, volatility is also demonstrated by a mass loss.

By carrying out these investigations at somewhat increased temperatures the behaviour of the mixtures over the time lapse can be simulated and so, for example, predictions can be made for fertilisers over a longer period of time at normal storage temperatures.

For the present model tests the specimens were produced according to the instructions given in Examples 1 to 5, and the respective mass loss for 50 to 110 mg respectively of the mixture is measured with thermal loading at between 30° C. and 130° C. by thermogravimetry (equipment made by Mettler Toledo, heating rate 1° C. per minute) (see Table 2).

TABLE 2

Summary of the results

| PVA/PVP | loss in % (after 45 mins./ 75° C.) | loss in % (after 70 mins./ 100° C.) |
|---|---|---|
| PVA | 30 | 40 |
| 2 parts PVA + 1 part PVP | 18 | 33 |
| 6 parts PVA + 1 part PVP | 26 | 34 |

It becomes clear that the PVA/PVP combination is most suitable for retaining the volatile 3-MP.

Results of the Open Storage

The urea granules enclosed in the cement mixer according to Example 8 were stored in a quantity of 9 kg to simulate storage in a pile in open-topped cylindrical vessels (height 30 cm, diameter 30 cm) at ambient temperature and humidity. After a storage period of 2, 4 and 6 weeks average samples were taken and the nitrification inhibitor TZ/3-MP content was determined analytically. The results are summarised in Table 3.

TABLE 3

Results of simulated storage tests

| Storage period | Active substance losses, in relation to the starting value | |
|---|---|---|
| (weeks) | TZ (%) | MP (%) |
| 2 | 0 | 2-5 |
| 4 | 0-1 | 8-10 |
| 6 | 0-3 | 15-20 |
| 6 | — | 89 [1] |

[1] Comparison test: pure 3-methylpyrazole sprayed on

Enclosed urea granules according to Example 9 were stored in the same way in parallel, and average samples taken from these were investigated analytically. The results are summarised in Table 4.

TABLE 4

Results of simulated storage tests

| Storage period | Active substance losses in relation to the starting value | |
|---|---|---|
| (weeks) | TZ (%) | MP (%) |
| 2 | 0 | 0-3 |
| 4 | 0-1 | 0-8 |
| 6 | 0-3 | 10-15 |
| 6 | — | 89 |

The invention claimed is:

1. An aqueous solution of a mixture for treating a urea-based fertiliser or a fertiliser containing ammonium or a combination thereof, wherein the solution comprises 1,2,4-triazole and 3-methylpyrazole in a weight ratio of 2/1 and at least one polyvinyl alcohol, polyvinylpyrrolidone and a tenside, wherein the polyvinylpyrrolidone has a molar mass in the range of 2,000 to 40,000 g/mol.

2. The aqueous solution of a mixture according to claim 1, wherein the polyvinyl alcohol has a hydrolysis level of at least 90% and viscosity of a 4% aqueous solution thereof is about 2 to 5 mPas.

3. The aqueous solution of a mixture according to claim 2, wherein the polyvinyl alcohol has a hydrolysis level of at least 95% and viscosity of a 4% aqueous solution thereof is about 2 to 4 mPas.

4. The aqueous solution of a mixture according to claim 1, wherein the tenside is an ester formed with poloxyethylene sorbintan and a fatty acid chose from lauric, palmitic, stearic and oleic acid.

5. The aqueous solution of a mixture according to claim 1, wherein the concentration of the combination of 1,2,4-triazole and 3-methylpyrazole in the weight ratio of 2/1 is in the range of 20 to 55 mass percent.

6. The aqueous solution of a mixture according to claim 1, wherein the concentration of the polyvinyl alcohol is in the range of 5 to 20 mass percent, the concentration of the polyvinylpyrrolidone is in the range of 0.1 to 5 mass percent, and the concentration of the tenside is in the range of 0.1 to 3 mass percent.

7. The aqueous solution of a mixture according to claim 1, wherein the 3-methylpyrazole is a salt formed with a mineral acid or an organic acid.

8. A method for producing a mixture according to claim 1, comprising adding a tenside, polyvinyl alcohol, polyvinylpyrrolidone and 1,2,4-triazole sequentially to water while stirring, wherein the mixture is stirred at temperatures of 40 to 85° C. until the polyvinyl alcohol has completely dissolved, and then the mixture is cooled to 20 to 30° C., followed by addition of 3 methylpyrazole until a weight ratio of 2:1 (1,2, 4-triazole:3-methylpyrazole).

9. The method for producing a mixture according to claim 7, wherein an acid is first dissolved in water, followed by sequential addition of 3-methylpyrazole, polyvinyl alcohol, polyvinylpyrrolidone and 1,2,4-triazole while stirring, and the resultant mixture is stirred at temperatures of 40 to 85° C. until the polyvinyl alcohol has completely dissolved and then the tenside is added.

* * * * *